Dec. 1, 1936.  E. M. ORBECK  2,062,997
VARIABLE GEARING FOR COMPUTING MECHANISM
Filed Feb. 14, 1935   5 Sheets—Sheet 1
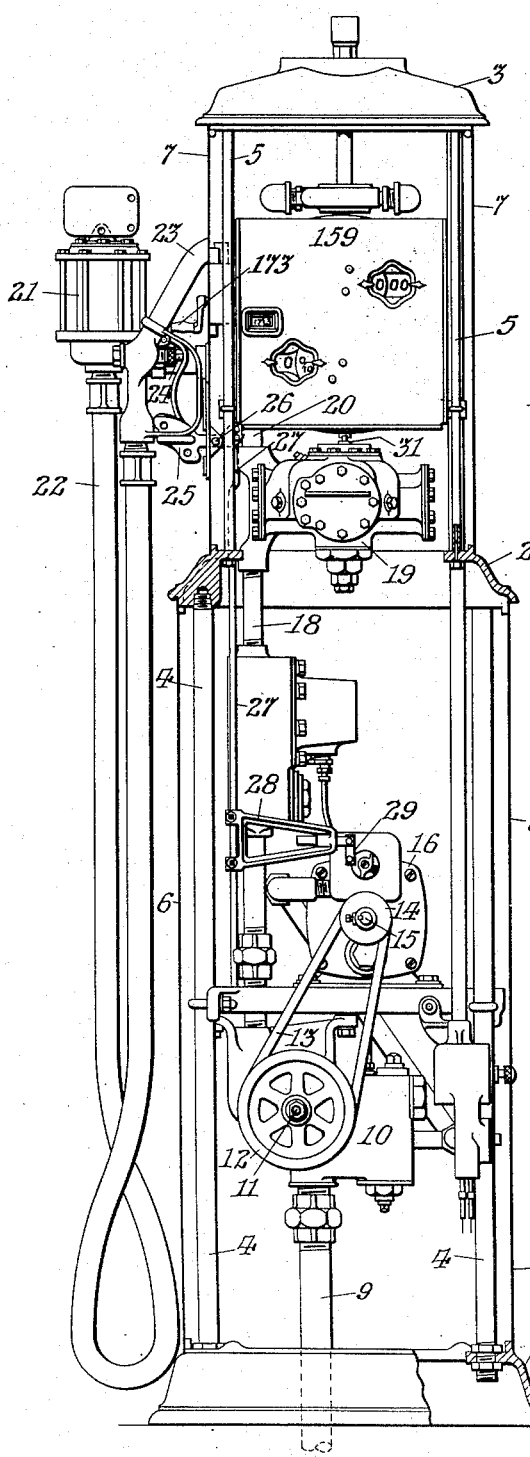
FIG. I.
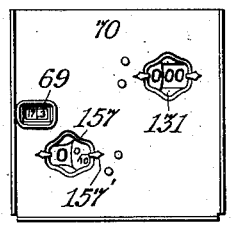
FIG. VIII.
INVENTOR:
EINAR M. ORBECK,
BY
Attorney.

Dec. 1, 1936.  E. M. ORBECK  2,062,997
VARIABLE GEARING FOR COMPUTING MECHANISM
Filed Feb. 14, 1935   5 Sheets-Sheet 2
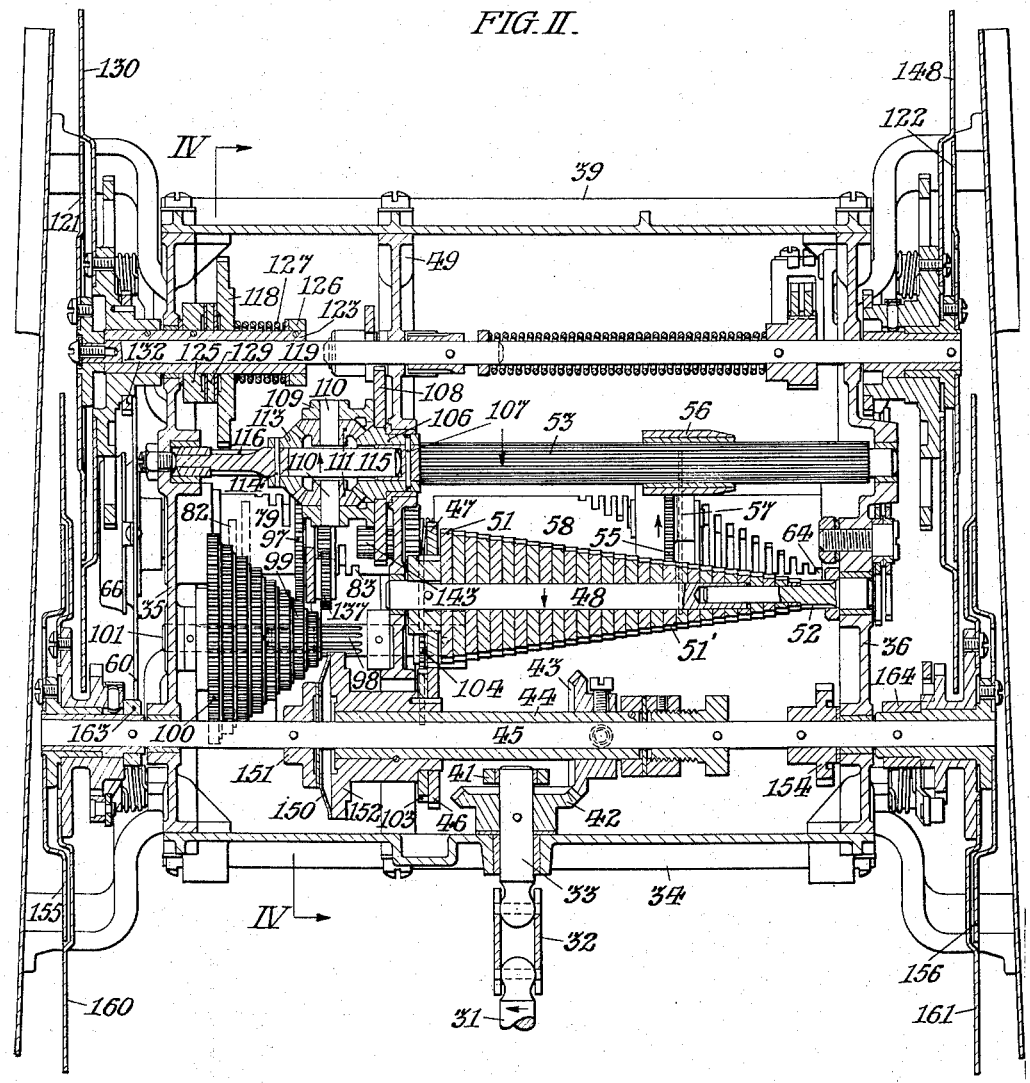
FIG. II.
INVENTOR:
EINAR M. ORBECK,
BY [signature]
Attorney.

Dec. 1, 1936. E. M. ORBECK 2,062,997
VARIABLE GEARING FOR COMPUTING MECHANISM
Filed Feb. 14, 1935   5 Sheets-Sheet 3
FIG. III.
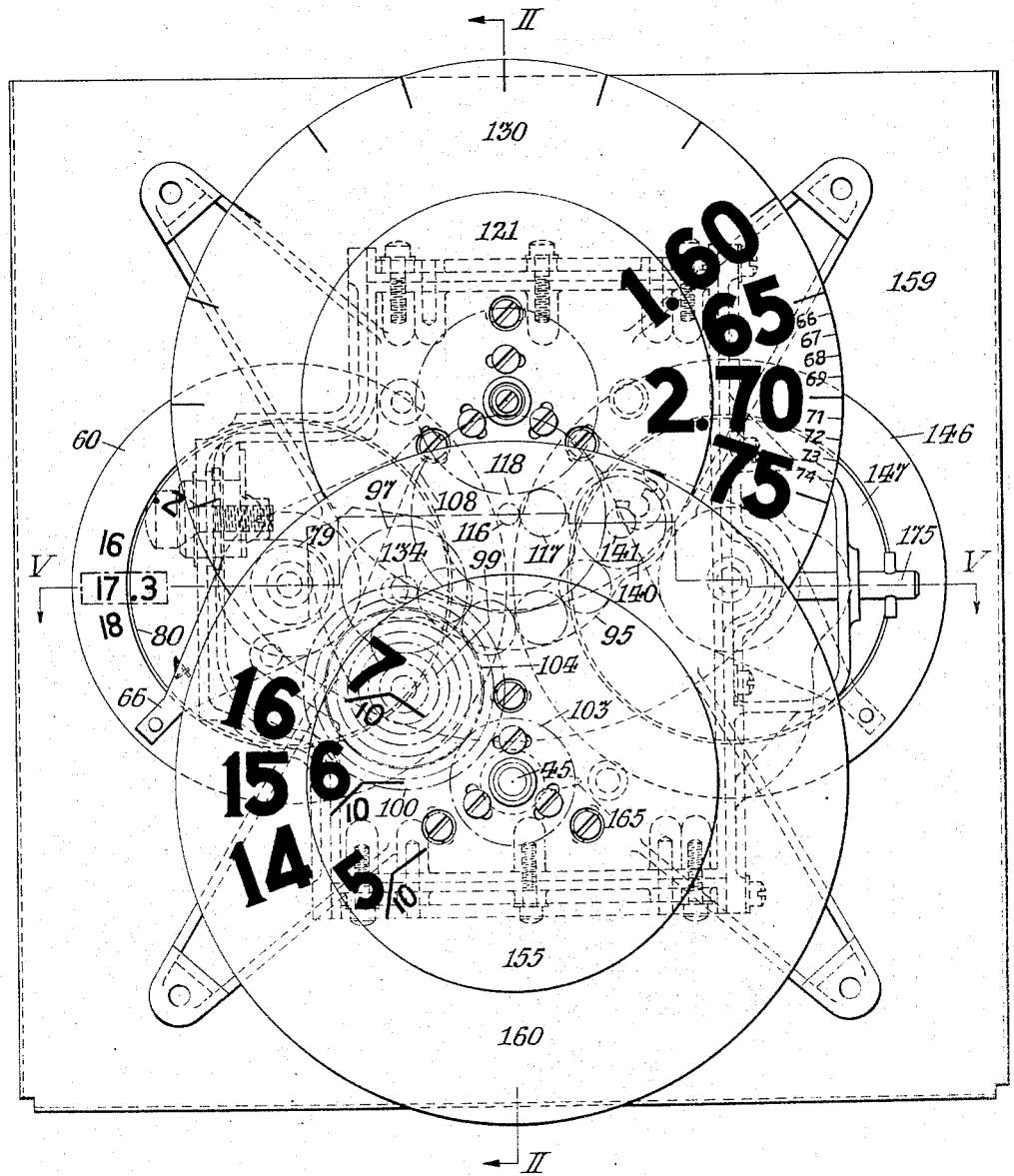
INVENTOR:
EINAR M. ORBECK,
BY Arthur E. Paige
Attorney.

Dec. 1, 1936.  E. M. ORBECK  2,062,997
VARIABLE GEARING FOR COMPUTING MECHANISM
Filed Feb. 14, 1935  5 Sheets-Sheet 4
FIG. IV.
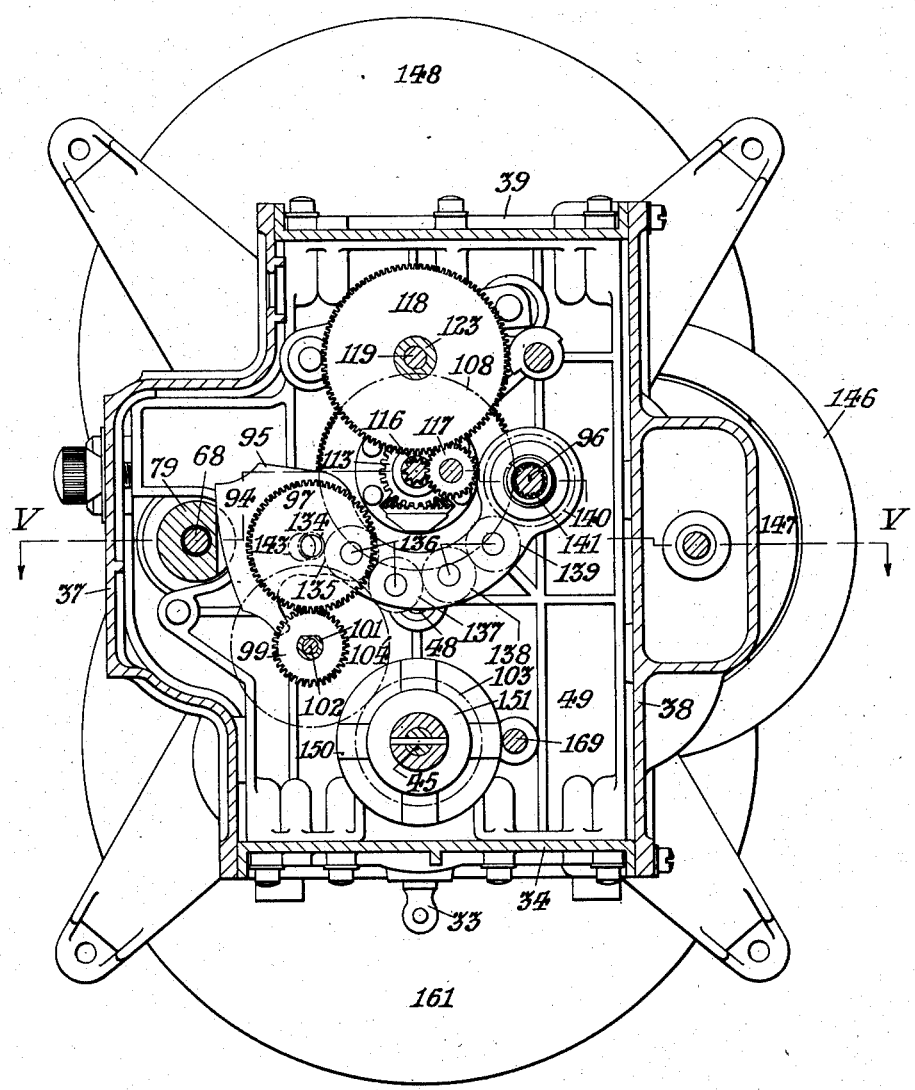
FIG. VII.
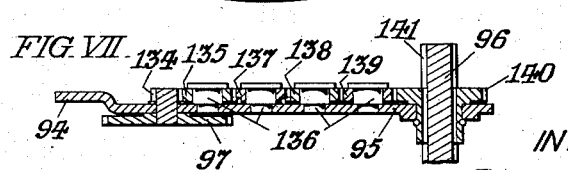
INVENTOR:
EINAR M. ORBECK,
BY
Attorney.

Dec. 1, 1936.　　　　E. M. ORBECK　　　　2,062,997
VARIABLE GEARING FOR COMPUTING MECHANISM
Filed Feb. 14, 1935　　　5 Sheets-Sheet 5
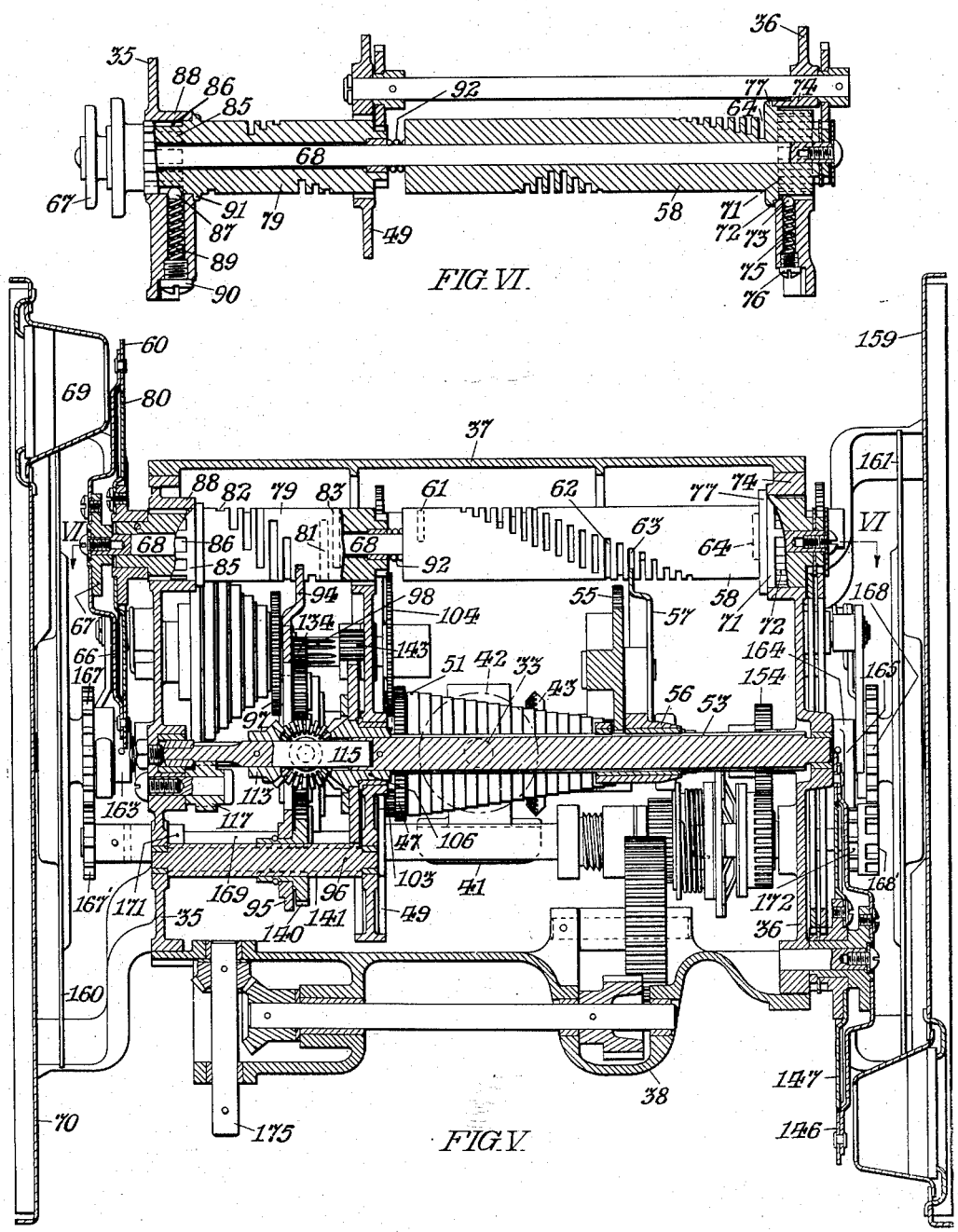
FIG. VI.
FIG. V.
INVENTOR:
EINAR M. ORBECK,
BY
Attorney.

Patented Dec. 1, 1936

2,062,997

UNITED STATES PATENT OFFICE 2,062,997

VARIABLE GEARING FOR COMPUTING MECHANISM

Einar M. Orbeck, Norristown, Pa., assignor to John Wood Manufacturing Company, Inc., Conshohocken, Pa., a corporation of Delaware Application February 14, 1935, Serial No. 6,465

3 Claims. (Cl. 74—283)

My invention is particularly applicable to metering pumps for dispensing gasoline. The volume of gasoline dispensed is usually measured in gallons and fractions of a gallon, and the price thereof varies in fractions of a cent. The purpose and effect of my invention is to provide means for not only registering the volume dispensed at each dispensing operation in gallons and fractions of a gallon, but also computing and registering the value of the volume dispensed at each dispensing operation in cents and fractions of a cent.

As hereinafter described, the value based upon the whole cents of the price and the value based upon any fraction of a cent of the price are separately automatically computed by different mechanisms, both of which are operated in conformity with and preferably by rotation of an element of a meter through which the liquid is dispensed, and the product of the computation is aggregated automatically in the registration of the value of the volume dispensed. It is characteristic of my invention that the means for aggregating the computations of the two mechanisms aforesaid is a train of planetary gearing, including two sun gears and a rotary carrier in coaxial relation; said carrier supporting the axes of a plurality of planetary gears in mesh with both of said sun gears.

In the form of my invention chosen for illustration, the cents computing mechanism is connected to turn one of said sun gears and the fractions of cents computing mechanism is connected to turn said carrier and the aggregated movements of the two computing mechanisms is manifested by rotation of the second sun gear which is operatively connected with means for indicating the aggregate value of the liquid dispensed.

In that embodiment of my invention, each computing mechanism includes a conical assemblage of gears of different sizes; the gears of the cents computing mechanism respectively corresponding with whole cents of the price and the gears of the fractions of cents computing mechanism respectively corresponding with different numbers of tenths of a cent of the price. The meter mechanism of the dispensing apparatus is selectively connected with gears of both of said computing mechanisms by manually adjustable selector gears so that the connection between the meter mechanism and said computing mechanisms may be varied in precise accordance with the current price of the liquid dispensed, whereby the aggregate of the two computations is in precise accordance with the volume and price per unit of volume of the liquid dispensed.

My invention includes the various novel features of construction and arrangement hereinafter more definitely specified.

In said drawings, Fig. I is an elevation of a metering pump of the curbstand type, conveniently embodying my invention.

Fig. II is a fragmentary vertical sectional view, taken on the line II, II in Fig. III, in the direction of the arrows on said line.

Fig. III is an elevation of the computing registering mechanism shown in Fig. II, as seen from the left hand side of that figure; being the rear of Fig. I.

Fig. IV is a vertical sectional view, taken on the line IV, IV in Fig. II, in the direction of the arrows on that line.

Fig. V is a plan sectional view of said computing and registering mechanism, taken on the line V, V in Figs. III and IV.

Fig. VI is a fragmentary vertical sectional view, taken on the line VI, VI in Fig. V, in the direction of the arrows on said line.

Fig. VII is a diagrammatic sectional view, taken through the centers of the gears in the selector train shown in Figs. II and IV, and indicated by dash and dot lines in Fig. III.

Fig. VIII is an elevation of the face of said computing registering mechanism opposite to that shown in Fig. I.

Referring to Fig. I, the liquid dispensing apparatus is principally contained in the housing which is adapted to be rigidly mounted upon a pavement or a platform at a curb or driveway and includes three transversely extending cast metal frame members, viz., the base member 1, the intermediate member 2, and the top member 3. Said frame members 1, 2 and 3 are rigidly connected in the vertical relation shown by a columnar frame including the standards 4 connecting the frame member 1 with the frame member 2, and the standards 5 connecting the frame member 2 with the frame member 3. Said housing includes the lower casing section 6 extending between said frame members 1 and 2 and the upper casing section 7 extending between said frame members 2 and 3. Both of said sections 6 and 7 are rectangular tubes of sheet metal with rounded corners.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the armature shaft 15 of the electric motor 16. The liquid is discharged from said pump 10 through the conduit 18 into the flow meter 19 from which it is discharged through the conduit 20 and the sight gage 21 into the flexible dispensing hose 22 which is provided at its free end with the nozzle 23 including the valve 24 which is normally closed but may be opened by the dispensing operator. The hook lever 25 which is fulcrumed at 26 on said casing 7 is provided to support the hose nozzle in idle position, the outer end of said lever being then depressed by the weight of the hose and nozzle. The inner end of said lever 25 is pivotally connected with the vertically reciprocatory rod 27 which carries the bracket 28 for operating the electric switch 29. The arrangement is such that when the outer end of said lever is lowered, as shown, said switch 29 is opened to deenergize said motor 16 and stop the operation of said pump 10, but, when said lever 25 is raised at its outer end, said switch is closed to operate said pump.

Said flow meter 19 includes a rotor which is turned by the passage of liquid therethrough from said conduit 18 to said conduit 20 and has the shaft 31 which makes one revolution for each gallon of liquid passed through said meter. As indicated in Fig. II, said meter shaft is arranged to operate the computing and registering mechanism above contemplated by means of the coupling 32 which connects said shaft 31 with the shaft 33 and is loose enough to permit said shafts to be slightly out of alinement. Said shaft 33 is journaled in the bottom wall 34 of the computing mechanism housing which includes the opposite end walls 35 and 36, the opposite side walls 37 and 38, and the top wall 39. Said shaft 33 is also journaled in the bracket 41 extending upwardly from said bottom wall 34 and carries the miter gear 42 engaging the miter gear 43 on the tubular shaft 44 which is mounted to rotate on the solid shaft 45 which is journaled at its opposite ends in said end walls 35 and 36. Said tubular shaft 44 carries the gear 46 which meshes with the gear 47 on the shaft 48, which is journaled in the end wall 36 and in the intermediate partition wall 49. Said gears 46 and 47 are of the same diameter, so that said shaft 48 is turned one revolution by each revolution of said meter shaft 31. Said shaft 48 rigidly carries a conical assemblage of thirty gears including opposite end gears 51 and 52 respectively corresponding with the highest and the lowest price of the fluid dispensed.

Said thirty gears may be selectively connected with the long pinion 53 by which the dials indicating the "Amount of sale", i. e. the value of the volume of liquid dispensed, are turned, as hereinafter described. Such selective connection is effected by the gear 55 which is carried by the rocker frame 56 so that it may be lifted to and from engagement with any selected gear in the conical series 51 to 52. Said frame 56 carries the blade 57 which, in any engaged position, extends as shown in Fig. V into the interlocking sleeve 58 which is controlled by the whole cents price display dial 60. Said sleeve 58 includes a series of thirty arcuate slots in its periphery, of which four are designated respectively 61, 62, 63, and 64. Said series of slots are so disposed in spaced relation circumferentially and axially as to correspond with the numbers on said dial 60 which represent the whole cents of the price and, in the embodiment of my invention illustrated, range from six cents to thirty-five cents. The slot 61 corresponds with the price of thirty-five cents; the slot 62 corresponds with the price of twenty-one cents; the slot 63 corresponds with the price of seventeen cents; and the slot 64 corresponds with the price of six cents.

As shown in Fig. III, said dial 60 is in fact a ring having the cross plate 66 extending diametrically between the numbers "6" and "35" upon one side and the numbers "20" and "21" upon the other side to support said ring in connection with its axial hub 67 and shaft 68. Interruption of the regular spacing of said numbers by the interposition of the ends of said plate 66 necessitates a corresponding irregularity in the spacing of said slots in said sleeve 58 which is rigidly connected with said shaft 68 so that said sleeve may be turned with said dial 60 to display a selected cents number of the price at the price display window 69, in the panel 70 shown in Fig. V, and at the same time locate the proper slot in the series on said sleeve 58 in position to receive the blade 57 when the gear 55 is in mesh with the proper price gear of the series 51 to 52 on said shaft 48. In the position shown in Figs. II and V, said blade is in the slot 63 corresponding with the price of seventeen cents, and thus positions the gear 55 in mesh with the gear 51' on said shaft 48, which gear 51' is the seventeen cent price gear.

Said sleeve 58 has at the right hand end thereof in Fig. V the ratchet head 71 which has a circular series of thirty depressions 72 in its circumference to selectively engage a ball detent 73 which is mounted in the bearing 74 on the housing wall 36 and provided with the spring 75 secured by the cover screw 76 causing said ball to continually frictionally engage said head by engagement with successive depressions 72 therein. The annular abutment flange 77 on said sleeve 58 serves to hold said sleeve in proper axial position by contact with the inner face of said bearing 74.

The similar interlocking sleeve 79 which is controlled by the fractional cent price display dial 80 is mounted to turn freely on the left hand end of said shaft 68 which, as above noted, is rigidly mounted in said sleeve 58. As indicated in Fig. III, said dial 80 has a circular series of nine numerals thereon respectively ".1" to ".9", representing tenths of a cent, for display through said window 69 at the right of the displayed numeral of the dial 60. Said sleeve 79 has a series of ten arcuate slots of which three are marked 81, 82, and 83. The slot 81 corresponds with the fractional cent price of ".1" and the slot 82 corresponds with the fractional cent price of ".9". The slot 83 corresponds with the zero position of said dial between the numerals ".1" and ".9", which position represents ".0" cent, and a zero mark might be included between the last named numerals but is omitted because of its similarity to the numeral ".9" which might be confusing to the operator and customers. Said sleeve 79 has the ratchet head 85 which has a circular series of ten depressions 86 in its circumference to selectively engage a ball detent 87 which is mounted in the bearing 88 on the housing wall 35 and provided with the spring 89 secured by the cover screw 90, causing said ball to continually frictionally engage said head by engagement with successive depressions 86 therein. The annular abutment flange 91 on said sleeve 79 serves to hold said sleeve in proper axial position by contact with the inner face of said bearing 88. Said sleeves 58 and 79 are thrust apart, against said bearings in the walls 35 and 36, by the spring 92 encircling said shaft 68 between said sleeves.

Said slots in the sleeve 79 are adapted to receive the blade 94 carried by the selector lever 95 which is fulcrumed on the shaft pinion 96, so that it may be adjusted axially, when said blade 94 is disengaged from the sleeve 79. Said lever 95 carries the selector gear 97 which may be thereby shifted to cooperate with any one of the series of nine fractional cent gears of which three are respectively marked 98, 99, and 100 and which are rigidly connected with the sleeve 101 and the shaft 102 arranged to be turned one revolution by the meter shaft 31 for each gallon of liquid dispensed. Such turning movement is effected by providing said sleeve 44 with the gear 103 which engages the gear 104 on said shaft 102. Said nine gears have respectively different numbers of teeth so as to effect computation upon a basis of different numbers of tenths of a cent, from ".1" to ".9", which they add to the computation, as hereinafter described. For instance, the gear 98, which is conveniently cut in said shaft 102, as indicated in Fig. II, corresponds with one-tenth of a cent, the gear 99 corresponds with three-tenths of a cent, and the gear 100 corresponds with nine-tenths of a cent. Said gear 97 is shown in Figs. II and IV engaged with the gear 99 which corresponds with the price display of .3 of a cent by the dial 80 in Fig. III.

The movements of the two computing mechanisms above described, respectively operating with reference to the whole cents portion of the price and a fraction of a cent portion of the price are aggregated for transmission to the registering and indicating mechanism by means of a train of planetary gearing best shown in Fig. II. That train includes the sun gear 106 which is rigidly connected with the left hand end of said long pinion 53, conveniently by the pin 107. The hub of said sun gear 106 is journaled in the intermediate housing partition wall 49 and supports the left hand end of said long pinion 53, as shown in Fig. II. Said sun gear is in coaxial relation with the carrier gear 108 which is journaled to rotate upon the hub of said sun gear 106. Said carrier gear is provided with bearings 109 for the shafts 110 of the planetary gears 111, which are in mesh with said sun gear 106 and also in mesh with the sun gear 113 which is in coaxial relation with said sun gear 106 and carrier gear 108 and rigidly connected, conveniently by the pin 114, with the shaft 115, which is journaled in the left hand end of said long pinion 53 and in the end wall 35 of the housing. The meter shaft 31 turns in the direction indicated by the arrow thereon in Fig. II with the effect of turning said long pinion 53 in the direction of the arrow marked thereon in Fig. II and with the effect of transmitting that motion in the reverse direction to the shaft 115. Said shaft 115 has the pinion 116 cut thereon in engagement with the idler gear 117, indicated in full lines in Fig. IV, which transmits the motion to the registering mechanism gear 118.

Said gear 118 is in coaxial relation with the shaft 119 with which the dollar unit dials 121 and 122 are rigidly connected at its opposite ends, as shown in Fig. II, but is carried by the tubular shaft 123 which is mounted to turn freely on said shaft 119 and journaled in a bearing in the housing wall plate 35 which supports both shafts at that end. However, said gear 118 is connected with said shaft 123 by friction clutch means to permit said gear 118 to remain stationary (in indirect connection with the meter shaft 31) while said shaft 123 is turned in the reverse direction to set the value indicating dials back to zero position as hereinafter described. Such clutch means includes the abutment rings 125 and 126 which are rigidly connected with said shaft 123, and the spring 127 which is compressed between said abutment 126 and said gear 118 to press the latter in frictional engagement with the clutch rings 129 interposed between said gear 118 and the abutment 125. Said tubular shaft 123 has, rigidly connected therewith, the dial 130 graduated with marks, partly indicated in Fig. III, indicating one hundred cents. The graduations of said cents dial 130 are successively presented in registry with the index window 131 in said panel 70 shown in Fig. VIII. Said cents dial shaft 123 also carries the gear 132 by which it is connected to cause the dollar dials 121 and 122 to turn, as hereinafter described.

The fraction of a cent computing mechanism remains idle during the operation last above described if the price basis of the computation is in whole cents only. However, if the price basis of the computation includes any fraction of a cent for instance, .3 as indicated in Fig. III, the movement of the computing mechanism based upon a fraction of a cent is aggregated with the movement imparted to the shaft 115 and its pinion 116 from the long pinion 53 as above described. To effect such aggregation, the selector gear 97, shown in Fig. IV, carries the pinion 134, upon the opposite side of said selector lever 95, in engagement with the gear 135 which is the first of a series of four idler gears mounted upon stud shafts 136 fixed in said lever 95, the other idlers being respectively 137, 138, and 139. The latter is in mesh with the gear 140 which is keyed upon the pinion 141 so as to turn the latter, conveniently by a circular series of internal teeth fitting between the teeth of said pinion, so that said gear 140 is readily movable axially on said pinion by the movement of said lever 95 but drives said pinion 141 in any position to which it is adjusted. Said pinion 141 engages said carrier gear 108 so as to turn the latter in accordance with the movement of the selected fraction of a cent gear in the conical series 98 etc. and thereby augment the movement of the sun gear 113 and, consequently, augment the movement of the registering mechanism gear 118 in accordance with the value of the fraction of a cent basis of the computation. However, if the price basis of the computation is entirely in whole cents, said selector lever is moved to the right in Fig. II so that said selector gear 97 does not engage any of the fractional cent gears 98 etc. and in position for the teeth of the pinion 134 carried by said selector gear 97 to be engaged by the detent 143 which is a stud fixed in said housing partition wall 49 and conveniently formed of a piece of pinion rod having teeth fitted to the pinion 134. The effect of that arrangement is to hold the carrier gear 108 stationary except when computation is being made upon a price basis including a fraction of a cent.

I find it convenient to locate the price dials 146 and 147 respectively like the dials 60 and 80 upon the right hand side of the housing, as indicated in Fig. V, and to also locate upon the right hand side of the housing indicated in Fig. II a cents dial 148 like the cents dial 130, and to connect the dollars dials 121 and 122 with the cents dials 130 and 148 by suitable means, so that the dollars dials are turned to manifest an increment of one dollar upon each revolution of said cents dials and to manifest the same figures upon opposite sides of the housing.

I have chosen for illustration such means and mechanism as constructed, arranged and specified at length in application Serial No. 750,805 filed October 31, 1934, for Letters Patent of the United States for Joseph C. Woodford's Improvement in computing registering mechanism for liquid dispensing apparatus, but it forms no part of the present invention, which is limited to the variable gearing including a differential gear train by which the computation of the value of the liquid dispensed based upon both the whole cents and the fraction of a cent portion of the price may be aggregated.

Referring to Fig. II, said tubular shaft 44, which is turned one revolution for each gallon of liquid dispensed through the meter 19, is frictionally engaged with the shaft 45 which it encircles by the friction spring disk 150 interposed between the collar 151 which is pinned on said shaft 45 and the flange 152 on the hub of said gear 103. Said shaft 45 has pinned thereon the gear 154 by which it may be set back manually, as hereinafter described, while said shaft 44 remains stationary in its indirect engagement with said meter shaft 31.

Said shaft 45 has fixed upon its respectively opposite ends the oppositely counterpart fractional gallon dials 155 and 156; the dial 155 being shown in Fig. III. Each of said dials 155 and 156 has a circular series of ten numerals thereon respectively $\frac{1}{10}$ to $\frac{9}{10}$ which represent tenths of a gallon, and zero representing the whole gallon. Said dials are normally turned by frictional connection of said shaft 45 with the shaft 44 shown in Fig. II and the gear 43 in mesh with the gear 42 driven by the shaft 31 of the meter 19, to indicate and register fractions of a gallon dispensed. Such frictional engagement of said shaft 45 with the tubular shaft 44 which normally drives it is merely to permit said shaft 45 to be set back to present said dial 155 in zero position at the window 157 and with respect to the index pointer 157' in said panel 70, and the dial 156 at the corresponding window in the panel 159 while the shaft 44 is held stationary by its connection with the meter 19.

The whole gallons dials 160 and 161 are respectively journaled upon the hubs of said fractional gallons dials 155 and 156, as shown in Fig. II, and prevented from axial displacement thereon by the collar 163 and the hub 164 of the tappet cam 165 which are fixed upon the shaft 45 by the pins securing said dial hubs. Said dials 160 and 161 have oppositely counterpart circular series of twenty numbers thereon from 1 to 0 representing twenty gallons the zero also representing the initial position of the dials. As said dials 160 and 161 are turned, the numbers thereon are respectively presented at said window 157 in said panel 70 and at the corresponding window in said panel 159. To turn them, I provide said dials 160 and 161 with respective gears 167 and 168, which are respectively in mesh with gears 167' and 168', on the gallons dials connecting shaft 169, as shown in Fig. V. Said shaft 169 is journaled in said opposite end plates 35 and 36 and the intermediate plate 49 of the computer housing; endwise movement of said shaft being prevented by the hub of said gear 167 and the collar 171 opposed thereto upon the inner face of the wall 35 and pinned to said shaft 169. Said tappet cam 165, carried by said shaft 45 of the fractional gallon dials 155 and 156, makes one revolution for each gallon dispensed through the meter 19 and, as shown in dotted lines in Fig. III, is in effect a gear with a single tooth adapted to successively engage the ten teeth on the star wheel 172 shown at the right hand end of said shaft 169 in Fig. V, conveniently in unitary relation with said gear 168. The relation of said tappet cam 165 and the star wheel 172 is such that, at each revolution of said fractional gallon dials 155 and 156, said shaft 169 is turned one-tenth of a revolution and turns said gallons dials 160 and 161 one-twentieth of a revolution to register and indicate dispensation of a gallon. Said dials are detained in each position to which they are thus shifted, conveniently by roller detent means, as in said Woodford application and forming no part of the present invention.

Said registering and indicating mechanism is arranged to be set back to zero position by clockwise rotation of the crank 173 shown in Fig. I extending exterior to the upper casing section 7. Said crank is, indirectly, operatively connected with the set-back shaft 175, indicated at the lower left hand side of Fig. V, which, through the train of gearing shown in that figure, is operative to set all of the value and volume indicating dials back to zero position by overcoming the friction of the clutches which are normally operative to advance the dials. However, the set-back mechanism indicated in this case is not herein claimed, being the subject matter of application Serial No. 754,201 filed November 22, 1934, by said Joseph C. Woodford, for Letters Patent of the United States. Furthermore, the mechanism may include respective total adders, of any suitable construction, for showing respectively the aggregate value and volume of liquid dispensed by successive operations, as in said Woodford application Serial No. 750,805.

It may be observed that the employment of two groups of gears of different sizes is advantageous, not only because the mechanism may be accordingly arranged to greater advantage with respect to the amount of space available within liquid dispensing apparatus of a standard size, but, because of the great advantage of having each group of such gears respectively relating to units of value, and fractions of a unit of value respectively local to the rotary members 58 and 76, by which the selection of the respective gears in the two groups is effected in conjunction with the respective elements 57 and 94. The dual arrangement shown facilitates the manipulation and ready adjustment of such gear selecting means.

I do not desire to limit myself to the precise details of construction and arrangement herein set forth, as it is obvious that various modifications may be made therein without departing from the essential features of my invention as defined in the appended claims.

I claim:

1. In a change speed gear set, the combination with a rotatable driving element; of two groups of gears of different sizes; one of said groups representing units, and the other of said groups representing fractions of such a unit; means for separately actuating each of said groups from said single driving element; means for separately manually selecting gears in each group for connection with said driving element; a driven element; and means for aggregating the movements of said two groups, to move said driven element, comprising a train of planetary gearing, including two sun gears and a carrier in coaxial relation, and a planetary gear supported by said carrier; wherein the fraction of a unit mechanism is connected with said carrier to turn the latter when that mechanism is operative; and detent means for preventing said carrier from turning when said fraction of a unit mechanism is idle.

2. Mechanism as in claim 1; wherein the means for selectively utilizing single gears in the fraction of a unit mechanism includes a selector train of gears which are continually in mesh with each other and axially movable together, and the detent means is a stationary stud having gear teeth for engagement with a gear of said selector train, and said selector train is axially movable to and from engagement with said detent.

3. Mechanism as in claim 1; wherein the means for selectively utilizing single gears in the fraction of a unit mechanism includes a selector train of gears which are continually in mesh with each other and axially movable together, and the detent means is a stationary stud having gear teeth for engagement with a gear of said selector train, and said selector train is axially movable to and from engagement with said detent; and means for holding said selector train in any selected position, including a lever supporting all of the gears of said selector train, free to oscillate upon the axis of one end gear of said train, and having at the opposite end of said train a blade, and means for engaging said blade in any selected axial position, and including the inoperative position of said train, comprising a member having an axially spaced series of slots for selective engagement with said blade.

EINAR M. ORBECK.